United States Patent
Choi et al.

(10) Patent No.: US 8,042,534 B2
(45) Date of Patent: Oct. 25, 2011

(54) SOLAR SERVO CONTROL TRACKING DEVICE

(75) Inventors: Kee Hyok Choi, Seoul (KR); In Cheol Lim, Seongnam-Si (KR); Hyun Woo Kim, Goyang-Si (KR); Hyeok Jae Woo, Seoul (KR); Kyoo Jae Shin, Sucheon-Si (KR)

(73) Assignee: SDN Company Ltd, Guui-Dong, Gwangjin-Gu, Seoul (KR)

( * ) Notice: Subject to any disclaimer, the term of this patent is extended or adjusted under 35 U.S.C. 154(b) by 343 days.

(21) Appl. No.: 12/222,759

(22) Filed: Aug. 15, 2008

(65) Prior Publication Data

US 2009/0229597 A1    Sep. 17, 2009

(30) Foreign Application Priority Data

Mar. 11, 2008    (KR) .................. 10-2008-0022639

(51) Int. Cl.
 *F24J 2/38* (2006.01)
(52) U.S. Cl. ........ 126/578; 126/573; 126/600; 126/621; 126/628; 136/245; 136/248; 136/259; 250/203.1; 250/203.4; 250/216
(58) Field of Classification Search .................. 126/578, 126/621, 628, 600, 573; 136/245, 248, 259; 250/216, 203.1, 203.4
See application file for complete search history.

(56) References Cited

U.S. PATENT DOCUMENTS

| | | | | |
|---|---|---|---|---|
| 4,031,444 A | * | 6/1977 | Beck, Jr. | 318/562 |
| 4,476,853 A | * | 10/1984 | Arbogast | 126/578 |
| 4,507,936 A | * | 4/1985 | Yoshino | 62/235.1 |
| 4,794,909 A | * | 1/1989 | Eiden | 126/575 |
| 5,317,145 A | * | 5/1994 | Corio | 250/203.4 |
| 5,747,967 A | * | 5/1998 | Muljadi et al. | 320/148 |
| 6,239,353 B1 | * | 5/2001 | Hall et al. | 136/246 |
| 7,252,084 B2 | * | 8/2007 | Pawlenko et al. | 126/605 |
| 7,516,557 B2 | * | 4/2009 | Courter | 33/270 |
| 2009/0159115 A1 | * | 6/2009 | Banin et al. | 136/248 |

* cited by examiner

*Primary Examiner* — Steven B McAllister
*Assistant Examiner* — Avinash Savani
(74) *Attorney, Agent, or Firm* — G W i P S

(57) ABSTRACT

A solar servo control tracking device is disclosed. The device includes: an integrated control device having a solar cell sensor unit detecting luminance at a solar azimuth, and an integrated control panel transmitting a control signal at a maximal solar azimuth, calculated by comparing a solar azimuth from the luminance at a solar azimuth; and solar tracking devices, respectively having a tracking device controller receiving the control signal via a wireless link, a high torque driving unit with an AC single phase inductor to generate driving torque by the control signal from the tracking device controller, solar module assemblies driven by the high torque driving unit to track the solar azimuth in accordance with the control signal, and an operating angle sensor unit installed to the high torque driving unit to detect operating angles of the solar module assemblies that track the sun by the control signal.

7 Claims, 10 Drawing Sheets

SOLAR SERVO CONTROL TRACKING DEVICE

BACKGROUND OF THE INVENTION

1. Field of the Invention

The present invention relates to a solar servo control tracking device, and more particularly, to a solar servo control tracking device remotely servo-controlling and remotely monitoring a solar module assembly and being smoothly driven in accordance with a solar azimuth.

2. Description of the Related Art

An existing solar tracking device uses a power transmission including a direct current (DC) motor and a worm gear to provide a driving force to a photo-conductive cell (CdS) and a solar module assembly by measuring luminance and a proximity sensor to detect a rotation angle of the tracking device.

However, the related art has the following disadvantages:

Since the existing CdS type light sensor is fixed to top of the solar module assembly to detect a solar azimuth entered in a specific azimuth, it is difficult to detect the solar azimuth when weather is changeable, that is, alternating cloudy and clear.

The existing CdS type light sensors are attached to the top of every solar module assembly one by one so that cost increases, and due to characteristics of the CdS, the solar azimuth detected by the tracking device in a power station has a large error range.

A drive unit using an existing DC motor has insufficient driving torque to drive more than six solar module assemblies.

Since a DC motor is employed as a driving source of the solar module assembly and a switching mode power supply converting commercial AC 220V into DC power is required, that becomes an economic burden.

Since a driven angle of the solar module assembly is estimated by counting pulses generated per one revolution using a proximity sensor in order to detect the driven angle of the solar module assembly, it is difficult to precisely control the driven angle of the solar module assembly.

Artificial manipulation is required in order to maintain the horizontal stability of the solar module assembly in order to prevent damage from, for instance, a typhoon at the site to which a typhoon is coming.

Since the solar module assembly is independently driven and there is no function of monitoring the same, an operator must visit the site at which the solar module assembly is installed to inspect it. Therefore, it is expensive to maintain the solar module assembly.

SUMMARY OF THE INVENTION

Therefore, the present invention has been made in view of the above problems, and the present invention provides a solar servo control tracking device performing remote servo-control and remote monitoring of a plurality of solar module assemblies through remote communication by a control signal in accordance with a solar azimuth measured by a single solar cell sensor, and smoothly driving six or more solar module assemblies in which a plurality of solar panels is arranged in the form of a matrix to produce a maximal electric power with a single power transmission, so that expense can be cut down and efficiency of generating electricity from the solar energy can be maximized.

In accordance with an aspect of the present invention, the above and other objects can be accomplished by the provision of a solar servo control tracking device comprising: an integrated control device including: a single solar cell sensor unit detecting luminance of sunrays with respect to a solar azimuth; and an integrated control panel remotely transmitting a control signal based on a maximal solar azimuth that is calculated by comparing a solar azimuth based on the luminance of sunrays detected by the solar cell sensor unit with a solar azimuth measured in real time; and a plurality of solar tracking devices, each of the solar tracking devices including: a tracking device controller remotely receiving the control signal through a wireless communication; a high torque driving unit having an AC single phase inductor to generate a driving torque by servo-control of the tracking device controller in accordance with the control signal; a plurality of solar module assemblies driven by the high torque driving unit to track the solar azimuth in accordance with the control signal; and an operating angle sensor unit installed to the high torque driving unit to detect a plurality of operating angles of the solar module assemblies that track the sun in accordance with the control signal.

The integrated control panel and each of the tracking device controllers further include a wireless communication module, a TCP/IP communication module, and either an RF communication module or a Bluetooth communication module to remotely monitor operating states of the solar module assemblies and the solar cell sensor unit with respect to the solar azimuth through the wireless communication modules and to remotely control the integrated control panel and the tracking device controllers through the TCP/IP communication modules and either the RF communication modules or the Bluetooth communication modules when the solar module assemblies and the solar cell sensor unit cannot track the sun in accordance with the solar azimuth.

Each of the high torque driving units is installed at the middle of the solar module assemblies, and comprises: an AC single phase inductor driven by a servo-control performed by the tracking device controller; a cooling fan attached to the AC single phase inductor to cool the AC single phase inductor; a primary reducer, a secondary reducer, and a third worm reducer, sequentially connected to the AC single phase inductor to generate a high torque, the third worm reducer having a pinion and a worm wheel to which the adjusting shaft of the solar module assembly is installed.

The operating angle sensor unit comprises: a sensor pinion connected to the pinion; a sensor worm wheel connected to the sensor pinion; and an operating angle sensor installed to the rotation shaft of the sensor worm wheel.

The operating angle detected by the operating angle sensor is transmitted to the integrated control panel through the tracking device controller.

The solar cell sensor unit comprises: a stepping motor providing rotary power in order to measure an incident angle of sunrays entering at a maximal luminance such that a solar cell scans luminance of 30° to 150°; a solar cell rotation shaft transmitting the rotary power of the stepping motor; a rotation angle sensor measuring an azimuth with respect to the luminance of the sunrays; a solar cell installed to the solar cell rotation shaft to measure the luminance of the sunrays; a base plate having supports to which the stepping motor, the solar cell rotation shaft, and the rotation angle sensor are installed; a case installed on the base plate to enclose and protect the stepping motor, the solar cell, the solar cell rotation shaft, and the rotation angle sensor; a transparent semi-spherical body installed on the top of the case to protect the components from moisture; and from water from entering the case and a waterproof connector installed to the case to connect an electric power wire and a control signal wire for input from the integrated control panel to the stepping motor and for output of the signal from the rotation angle sensor.

The integrated control panel measures the luminance of sunrays in a range of 30 degrees to 150 degrees through the solar cell sensor unit, analyses the measured luminance of sunrays with respect to the operating angle detected by the operating angle sensor units to set an operation angle range for the maximum luminance, and compares the solar azimuth measured in real time with the operating angle range at the maximum luminance to calculate an operating angle control signal of the solar module assemblies and to transmit the operating angle control signal to the tracking device controllers via a wireless line. Each of the tracking device controllers receives the operating angle control signal from the integrated control panel to calculate an error of the operating angle measured by the operating angle sensor unit, performs the compensation by the proportional-integral-derivative (PID) servo-control using the calculation to drive the AC single phase inductor so as to drive the solar module assembly, and transmits the operating angle of the solar module assembly and the phase current signal of the AC single phase inductor to the integrated control panel via a wireless link when the solar module assembly malfunctions in being unable to track in accordance with the operating angle control signal.

The integrated control panel receives the operating angles of the solar module assemblies and the measured phase currents of the AC single phase inductors from the tracking device controllers via a wireless link to transmit the operating angle control signals to the tracking device controllers to be operated by the operating angle control signals, or to transmit control signals to the tracking device controllers to stop the solar module assemblies when the AC single phase inductors are in an over current state.

Each of the solar module assemblies comprises solar panels of a 4*4 matrix array and the number of the solar module assemblies is at least six.

The integrated control panel comprises: a manual/automatic mode switch selected by an operator; a real time counter to which a period is set to measure the solar azimuth in real time; a first buffer circuit to which a rotation angle of the solar cell sensor unit is input through the manual/automatic mode switch selected by the operator; a second buffer circuit to which the luminance of sunrays, measured at the rotation angle by the solar cell sensor unit by the selection of the manual/automatic mode switch, is input; a microcomputer receiving the rotation angles of the first and second buffer circuits and the luminance of sunrays to output a rotation angle control signal through Darlington transistors to the solar cell sensor unit, and outputting an operating angle control signal with respect to a maximal solar azimuth calculated by comparing the solar azimuth with respect to the luminance of sunrays with a solar azimuth that is measured in real time in accordance with the period of the real time counter; a wireless communication module transmitting the operating angle control signal to the tracking device controllers; a memory in which data of phase current of the AC single phase and the operating angles of the solar module assemblies received from the tracking device controllers through the wireless communication module are stored; and a TCP/IP communication module transmitting the phase current and operating angle data read and outputted from the memory by the microcomputer.

Each of the tracking device controllers comprises: a manual/automatic mode switch selected by an operator; a buffer circuit to which the operating angle of the solar module assembly detected by the operating angle sensor unit is inputted when the automatic mode of the manual/automatic mode switch is selected by the operator; wireless communication modules receiving an operating angle control signal remotely transmitted by the integrated control panel; a microcomputer having a memory storing the operating angle and the phase current of the AC single phase inductor and outputting a servo-control signal for a proportional-integral-derivative (PID) servo-control of the solar module assembly to the AC single phase inductor of the high torque driving unit through a forward relay and a reverse relay in accordance with a value calculated from the operating angle inputted through the buffer circuit and the operating angle control signal inputted through the wireless communication modules to control the operating angle of the solar module assembly; and either an RF communication module or a Bluetooth communication module remotely transmitting data on the operating angle and the phase current of the AC single phase inductor stored in the memory.

The microcomputer of the integrated control panel further outputs a maximal solar azimuth; the wireless communication module of the integrated control panel remotely transmits the outputted maximal solar azimuth to the tracking device controllers; each of the tracking device controllers further comprises: a real time counter in which a period is set to measure the solar azimuth by time period in real time; the wireless communication modules of the respective tracking device controllers which remotely receive the maximal solar azimuth. Each of the microcomputers of the tracking device controllers compares the maximal solar azimuth remotely received through the wireless communication modules with the solar azimuth calculated by a real time azimuth equation using the real time counter, and outputs only the verified operating angle control signal to the AC single phase inductors of the high torque driving units.

The integrated control panel further comprises: a horizontal position angle correction mode switch that initially sets the horizontal angles of the solar module assemblies; and a time setting mode switch that sets an initial time of the integrated control panel in real time.

Each of the tracking device controllers further comprises: a horizontal position angle correction mode switch that initially sets the horizontal angles of the solar module assemblies; and a time setting mode switch that sets an initial time of each of the tracking device controllers in real time.

According to the present invention, since accuracy, rapid response, and tracking accuracy with respect to the operating angle control performed for the solar module assemblies are improved, efficiency of photovoltaic power generation can be optimized, and a plurality of solar module assemblies can be controlled in an optimized state, at once, by a single solar cell sensor unit. The high torque driving unit can generate a high torque to drive the solar module assemblies with 20% higher weight than the existing solar module assemblies so that efficiency of the photovoltaic power generation can be maximized.

In other words, the photovoltaic power generation can be maximized by the high torque driving unit capable of tracking sun rays while loaded with the proposed solar module assemblies with 20% more weight than the existing ones, the integrated control panel calculating an optimal solar azimuth, and the integrated control panel and the tracking device controllers installed with remote communication modules remotely monitoring the operating angles of the solar module assemblies and the operation states of the AC single phase inductors in order to track the sunrays and perform remote servo-control.

DETAILED DESCRIPTION OF THE PREFERRED EMBODIMENTS

Hereinafter, preferred embodiments of the present invention will be described in detail with reference to the accompanying drawings.

Figure 1:
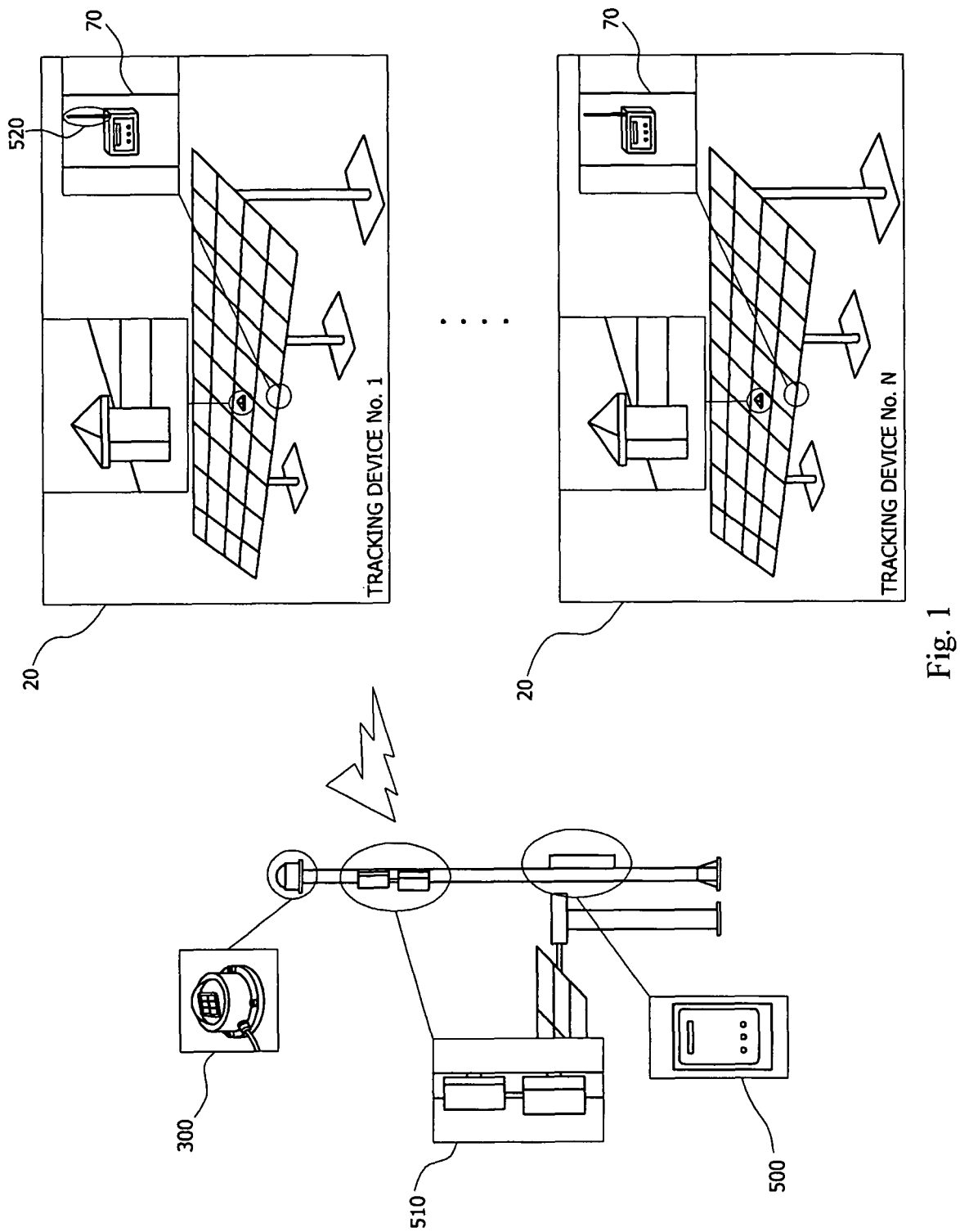
FIG. 1 is a view illustrating technical configuration of a solar servo-control tracking device according to an embodiment of the present invention.
Figure 2:
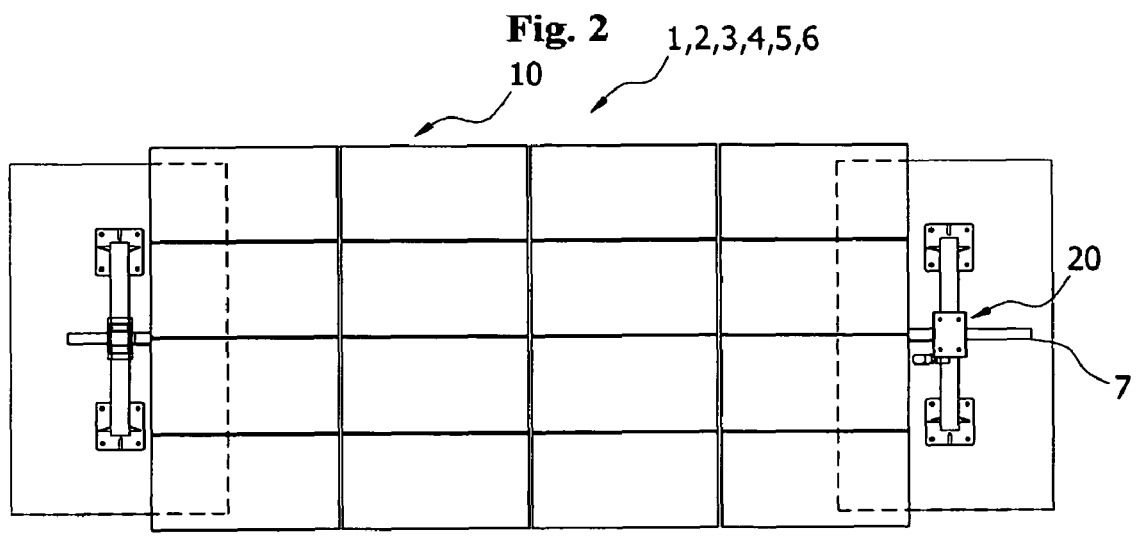
FIG. 2 is a plan view illustrating an assembly of a single solar module assembly of the solar servo-control tracking device according to the embodiment of the present invention.
Figure 3:
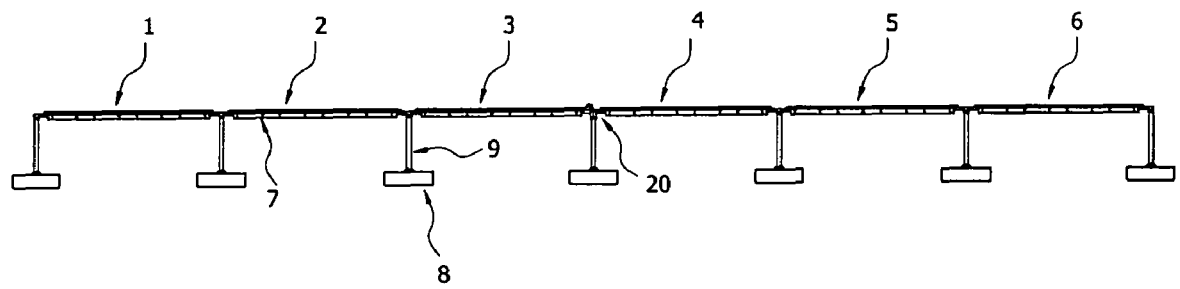
FIG. 3 is a front view illustrating a solar tracking device of the solar servo-control tracking device according to the embodiment of the present invention.
Figure 4:
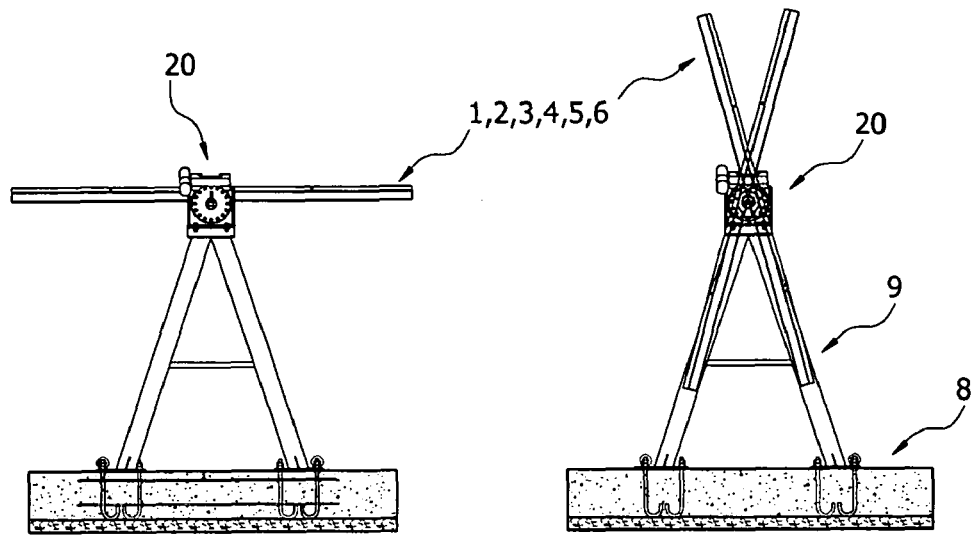
FIG. 4 is a side view of the solar servo control tracking device in FIG. 3 and illustrating an operating range of a driving angle.

FIGS. 1 to 11 illustrate a technical configuration of an integrated control device and a solar servo-control tracking device according to an embodiment of the present invention, in which: FIG. 1 is a view illustrating technical configuration of a solar servo-control tracking device according to an embodiment of the present invention; FIG. 2 is a plan view illustrating an assembly of a single solar module assembly of the solar servo-control tracking device according to the embodiment of the present invention; FIG. 3 is a front view illustrating a solar tracking device according to the embodiment of the present invention; and FIG. 4 is a side view of the solar tracking device in FIG. 3 and illustrating an operating range of a driving angle.

Figure 5:
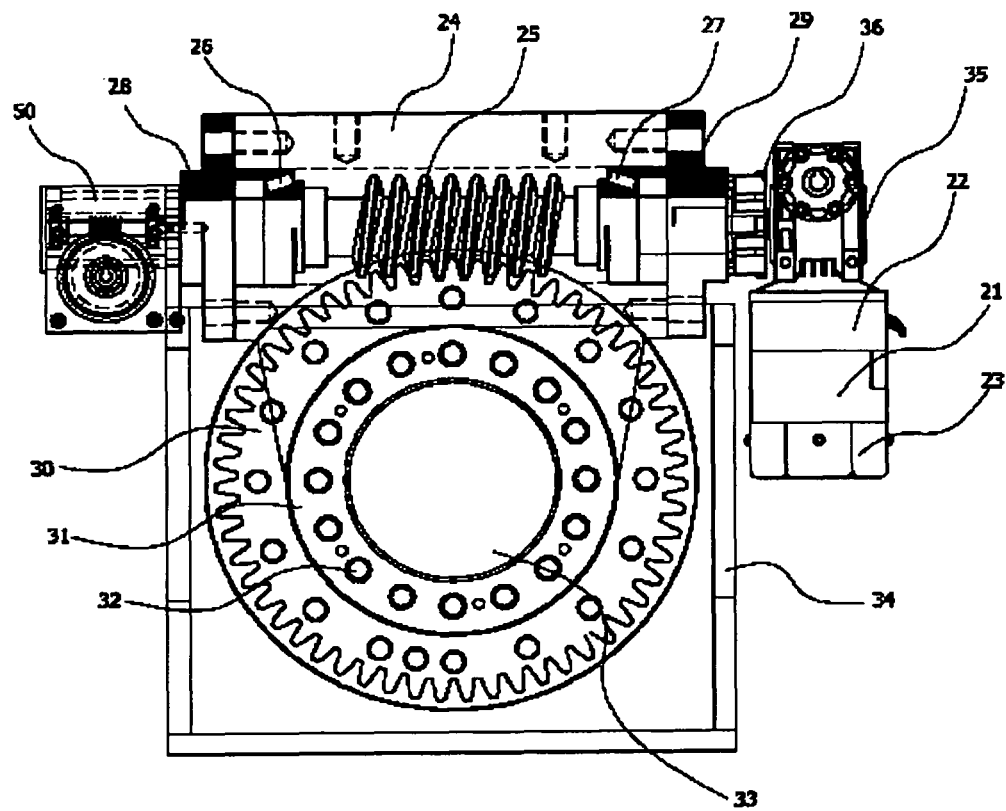
FIG. 5 is a detailed front view illustrating structure of power transmission of the solar servo control tracking device.
Figure 6:
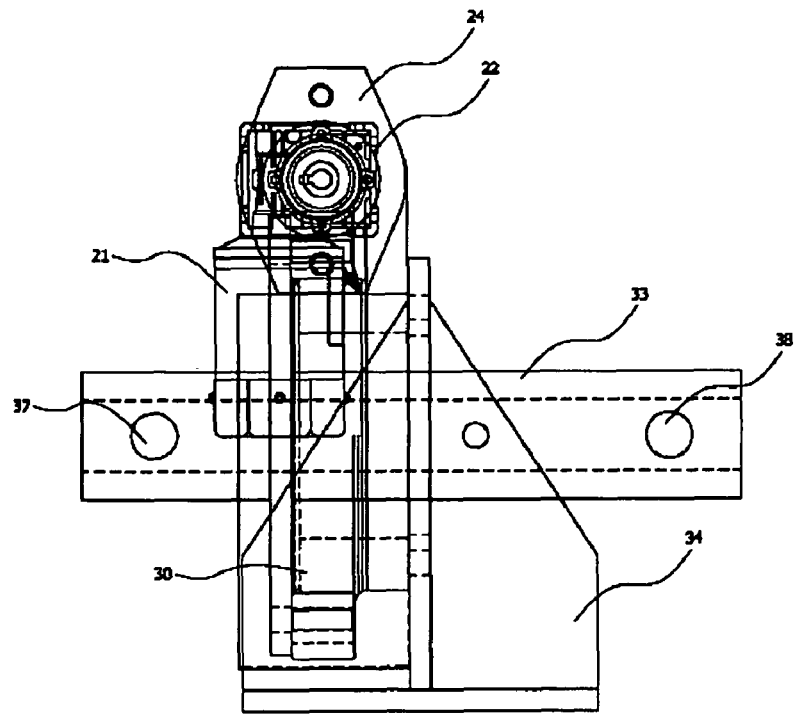
FIG. 6 is a right-side view of a power driving unit of the solar servo-control tracking device in FIG. 5.
Figure 7:
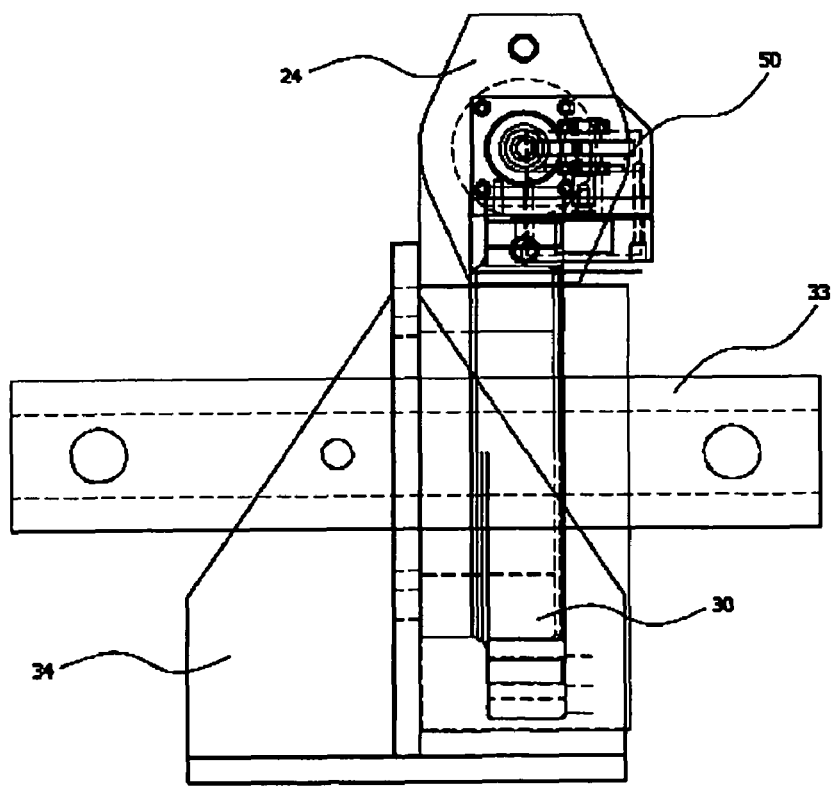
FIG. 7 is a left-side view of the power driving unit of the solar servo-control tracking device in FIG. 5.
Figure 8:
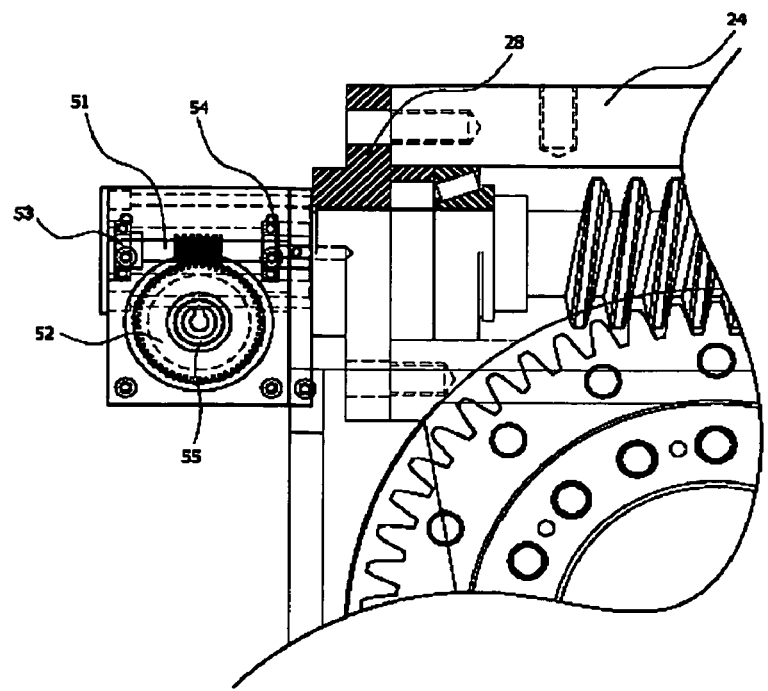
FIG. 8 is an enlarged view illustrating an operating angle sensor unit in FIG. 5.
Figure 9:
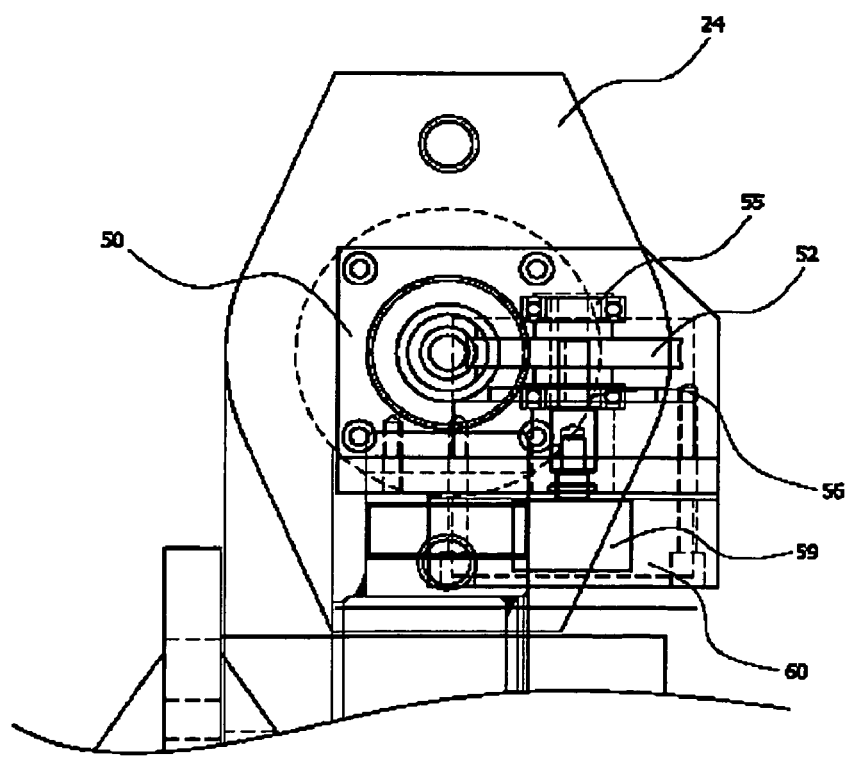
FIG. 9 is an enlarged view illustrating the operating angle sensor unit in FIG. 7.

FIG. 5 is a detailed front view illustrating the structure of a power transmission of the solar tracking device, FIG. 6 is a right-side view of a power driving unit of the solar servo-control tracking device in FIG. 5, FIG. 7 is a left-side view of the power driving unit of the solar servo-control tracking device in FIG. 5, FIG. 8 is an enlarged view illustrating an operating angle sensor unit in FIG. 5, and FIG. 9 is an enlarged view illustrating the operating angle sensor unit in FIG. 7.

Figure 10:
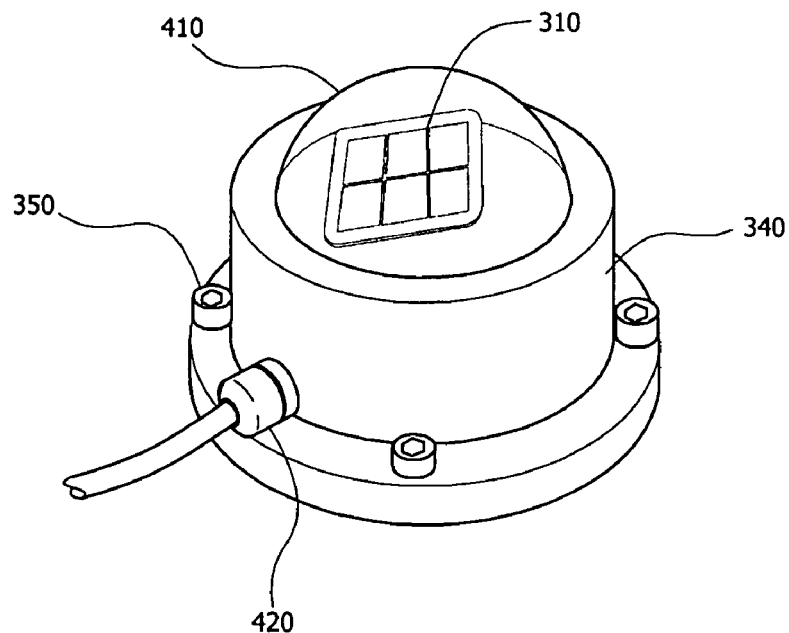
FIG. 10 is a photograph illustrating an actual appearance of a solar cell sensor unit of the solar servo-control tracking device according to the embodiment of the present invention.
Figure 11:
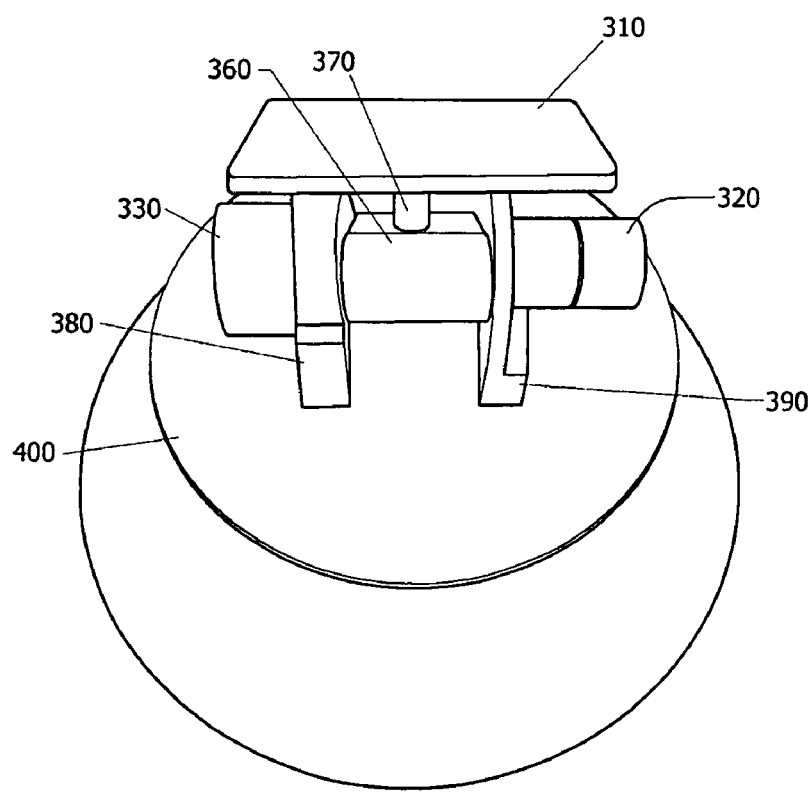
FIG. 11 is a photograph illustrating an actual structure of the solar cell sensor unit of the solar servo-control tracking device according to the embodiment of the present invention.

FIG. 10 is a photograph illustrating an actual appearance of a solar cell sensor unit of the solar servo-control tracking device according to the embodiment of the present invention, and FIG. 11 is a photograph illustrating an actual structure of the solar cell sensor unit of the solar servo-control tracking device according to the embodiment of the present invention.

The solar servo-control tracking device according to an embodiment of the present invention, as illustrated in FIG. 1, includes an integrated control device having a single solar cell sensor unit 300 and an integrated control panel 500, and plural solar tracking devices respectively having a tracking device controller 70, a high torque driving unit 20, a plurality of solar module assemblies 10, and an operating angle sensor unit 50 (See FIG. 5).

The solar cell sensor unit 300 of the integrated control device detects solar luminance with respect to a solar azimuth, and the integrated control panel 500 remotely transmits a control signal with respect to a maximal solar azimuth that is calculated by comparing a solar azimuth detected by the solar cell sensor unit 300 with a solar azimuth measured by an azimuth equation in real time to the tracking device controller 70 via a wireless communication.

The solar azimuth A may be obtained from the following azimuth equation by using time H and declination δ.

$$\tan(A) = \frac{-\cos(\delta)\cos(\pi)\sin(H)}{\sin(\delta) - \sin(\pi)\sin(\alpha)}$$

where $\sin(\alpha)=\sin(\delta)\sin(\pi)+\cos(\delta)\cos(\pi)\cos(H)$.

Each of the tracking device controllers 70 of the solar tracking devices (1 to N in FIG. 1) receives a control signal from the integrated control panel 500 with respect to the solar azimuth via a wireless line, the high torque driving units 20 are respectively installed in the tracking devices 1 to N to provide driving forces to the tracking devices 1 to N through AC single phase inductors 21 generating a driving torque by a servo-control of the tracking device controllers 70 in accordance with the control signal, each of the solar module assemblies 10 is driven by the high torque driving unit 20 to track the solar azimuth in accordance with the control signal, and each of the operating angle sensor units 50 is installed to the respective high torque driving units 20 to detect the operating angles of the solar module assemblies tracking the sun in accordance with the control signal.

In this case, the control signal from the integrated control panel 500 is an operating angle controlling signal to implement an operating angle servo-control of the solar module assemblies 10 of the solar tracking devices in accordance with the solar azimuth measured by the solar cell sensor unit 300.

On the other hand, the integrated control panel 500 and each of the tracking device controllers 70 respectively include wireless communication modules, TCP/IP communication modules, RF communication modules or Bluetooth communication modules to enable an operator to remotely monitor operating states of the solar module assemblies 10 and the solar cell sensor unit 300 with respect to the solar azimuth through the wireless communication modules and to remotely control the integrated control panel 500 and the tracking device controllers 70 through the TCP/IP communication modules, the RF communication modules, or the Bluetooth communication modules when the solar module assemblies 10 and the solar cell sensor unit 300 malfunction and cannot track the sun in accordance with the solar azimuth. Thus, unlike the related art, it is not necessary for the operator to directly manipulate at the site in such a way as to make the solar module assemblies be horizontal when a typhoon is coming, to make the solar module assemblies be vertical when it snows, to check the solar module assemblies for maintenance, etc.

Each of the solar module assemblies 10, as illustrated in FIG. 2, include 16 solar panels in a 4*4 matrix array with 20% more weight than the existing 12 solar panels to maximize photovoltaic power generation. A single solar tracking device includes six solar module assemblies 1, 2, 3, 4, 5, and 6 respectively each with 16 solar panels (at least 6 solar module assemblies, that is, six or more solar module assemblies) such that the high torque driving unit 20 (FIG. 5) is installed between third and fourth solar module assemblies 3 and 4, that is, in the middle of the six solar module assemblies to effectively drive the six solar module assemblies at once.

In order to maximize the photovoltaic power generation per unit area, the solar module assemblies 1, 2, 3, 4, 5, and 6 with increased weight more than 20%, as illustrated in FIGS. 3 and 4, are supported by and fixed to a solar module assembly adjusting shaft 7 through which a driving torque is transmitted from the high torque driving unit 20. The solar module assembly adjusting shaft 7 is supported by an A-shaped support 9 fixed on a concrete structure 8 on the ground for the steady support of the solar module assemblies.

FIG. 4 is a side view of the solar tracking device in FIG. 3 and shows that the solar module assemblies 1 to 6 may be driven in an operating angle of 30 degrees to 150 degrees. The solar module assemblies 1 to 6 are servo-controlled in the operating angle range of 30 degrees to 150 degrees by the tracking device controllers 70. In this case, the operating angles are detected by the operating angle sensor units 50 respectively attached to sides of the high torque driving units 20.

Unlike the related art, in order to drive the solar module assemblies that are 20% heavier, high torque driving units 20 are needed. Each of the high torque driving units 20 is installed at the middle of each of the solar module assemblies, and as illustrated in FIG. 5, includes an AC single phase inductor 21, a cooling fan 23, a primary reducer 22, a secondary reducer 35, and a third worm reducer 25 and 30. A reference numeral 36 indicates a second reducer fixture.

The AC single phase inductors 21 are driven through the servo-control performed by the tracking device controllers 70 in accordance with the control signal from the integrated control panel 500, and the cooling fans 23 are attached to the AC single phase inductors 21 to cool heat generated by the AC single phase inductors 21. To each of the AC single phase inductors 21, the primary reducer 22, the secondary reducer 35, and the third worm reducer 25 and 30 are sequentially connected such that a pinion 25 of the third reducer is connected to the secondary reducer 35 and a worm wheel 30 is connected to the pinion 25 in a sequential manner to generate maximal driving torque. The solar module assembly adjusting shaft 7 to which the solar module assembly is fixed is installed on the worm wheel 30.

In order to fix the pinion 25 of the third worm reducer, a worm gear upper fixture 24, a worm gear left fixture 26, a worm gear right fixture 27, a worm gear left cover 28, and a worm gear right cover 29, as illustrated in FIG. 5, are provided. The driving force of the pinion 25 of the third worm reducer is transmitted to the worm wheel 30 at a gear ratio of 55:1, and the worm wheel 30 is coupled with a power transmission rotary shaft 31 and a power transmission shaft 33 and is fixed thereto by fixing pins inserted into power transmission shaft fixing holes 32.

As illustrated in FIGS. 6 and 7, the solar module assembly adjusting shaft 7 of FIG. 2 is coupled to the left attaching hole 37 and right attaching hole 38 of the power transmission shaft 33 to drive the solar module assembly. The high torque driving unit 20 is fixed to a base plate 34.

The high torque driving unit 20 provides a driving force for an increased load and employs the AC single phase inductor 21 capable of generating a driving force without a switching mode power supply (SMPS) additionally required when the existing DC motor is employed so that power consumption can be minimized, costs can be reduced, and durability of the solar tracking device can be improved.

As illustrated in FIGS. 8 and 9, in order to perform the servo-control of rotation angle of the solar module assemblies, the operating angle sensor unit 50, detecting an absolute operating angle of the solar module assembly, must be installed on the driving unit. The operating angle sensor unit 50 includes a sensor pinion 51, a sensor worm wheel 52, and an operating angle sensor 59. The sensor pinion 51 is connected to the pinion 25 of the third worm reducer of the driving unit 20, the sensor worm wheel 52 is connected to the sensor pinion 51, and the operating angle sensor 59 is installed to the rotation shaft of the sensor worm wheel 52. An operating angle detected by the operating angle sensor 59 is transmitted to the integrated control panel 500 via the tracking device controller 70 through a wireless communication link.

As such, the operating angle sensor unit 50 having the same gear ratio (55:1) as the power transmission shaft 33 of the driving unit 20 is coupled with the pinion 25 of the third worm reducer so that the operating angle of the solar module assembly can be detected as a continuous absolute angle.

In other words, since a gear ratio between the pinion 25 and the worm wheel 30 is 55:1, when a gear ratio between the sensor pinion 51 and the sensor worm wheel 52 is set to 55:1, an operating angle of the power transmission shaft 33 to which the solar module assemblies are coupled is exactly the same as that of the sensor worm wheel 52. To this end, the sensor pinion 51 meshed with the pinion 25 will rotate smoothly due to a bearing 53 fixed to a left side of the pinion and a bearing 54 fixed to a right side of the pinion.

Referring to FIG. 8, the sensor pinion 51 transmits the gear ratio to the sensor worm wheel 52, and the sensor worm wheel 52 rotates smoothly due to a bearing 55 fixed to the upper side of the worm wheel 52 and a bearing 56 fixed to the lower side of the worm wheel 52 as illustrated in FIG. 9. An operating angle sensor 59 capable of detecting 360 degrees is installed on a rotation shaft of the sensor worm wheel 52 to detect an absolute rotation angle.

The solar cell sensor unit 300, as illustrated in FIGS. 10 and 11, includes a stepping motor 320, a solar cell rotation shaft 360, a rotation angle sensor 330, a solar cell 310, a base plate 400 having supports 380 and 390, a case 340, a transparent semi-spherical body 410, and a water-proof connector 420.

The stepping motor 320 provides rotary power in order to measure an incident angle of sunrays entering at a maximum luminance such that the solar cell 310 can scan luminance of 30 degrees to 150 degrees. The solar cell rotation shaft 360 transmits the rotary power of the stepping motor 320. The rotation angle sensor 330 measures an azimuth with respect to the luminance of the sunrays. The solar cell 310 is installed to the solar cell rotation shaft 360 to measure the luminance of the sunrays. On the base plate 400, a left support 380 and a right support 390 to which the stepping motor 320, the solar cell rotation shaft 360, and the rotation angle sensor 330 are installed. The case 340 is installed on the base plate 400 to enclose and protect the stepping motor 320, the solar cell 310, the solar cell rotation shaft 360, and the rotation angle sensor 330. The transparent semi-spherical body 410 is installed on the top of the case 340 to protect the components in the case from entering water and from moisture. The water-proof connector 420 is installed to the case 340 to connect an electric wire providing electric power, and wires to input the control signal from the integrated control panel 500 to the stepping motor 320 and to output a signal from the rotation angle sensor 330. A reference numeral 350 indicates a bolt fixture attaching the case 340 to the base plate 400.

Figure 12:
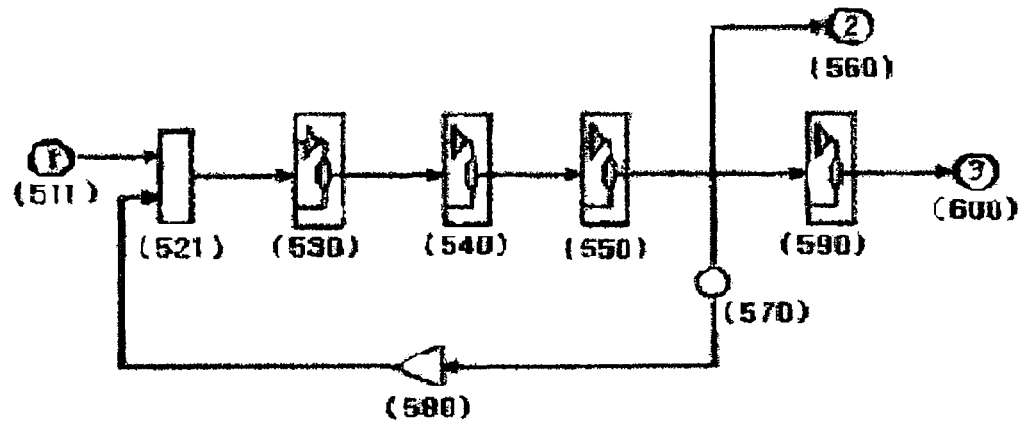
FIG. 12 is a schematic diagram illustrating a measurement of a solar azimuth performed by an integrated control panel of the solar servo-control tracking device according to an embodiment of the present invention.
Figure 13:
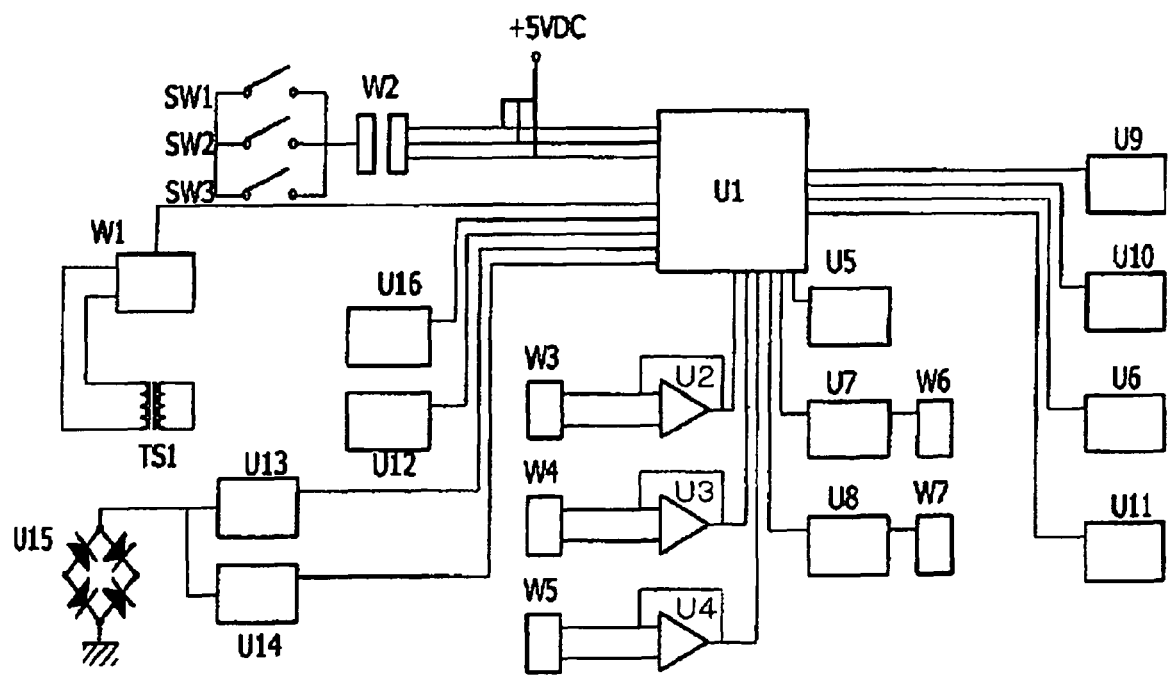
FIG. 13 is circuit diagrams illustrating the integrated control panel of the solar servo-control tracking device.
Figure 14:
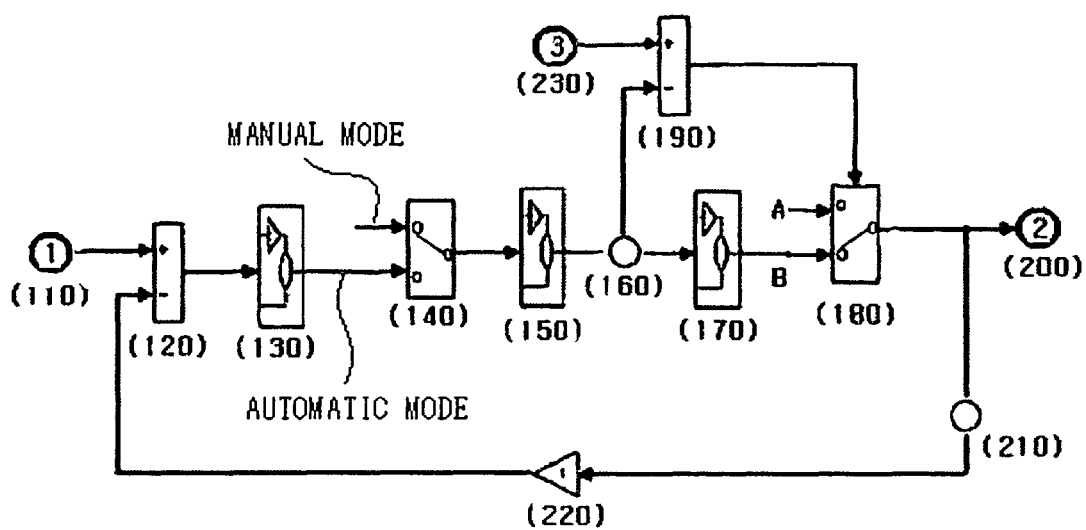
FIG. 14 is a schematic diagram illustrating an operating angle servo-control of the solar module assembly of the solar servo-control tracking device according to the embodiment of the present invention.
Figure 15:
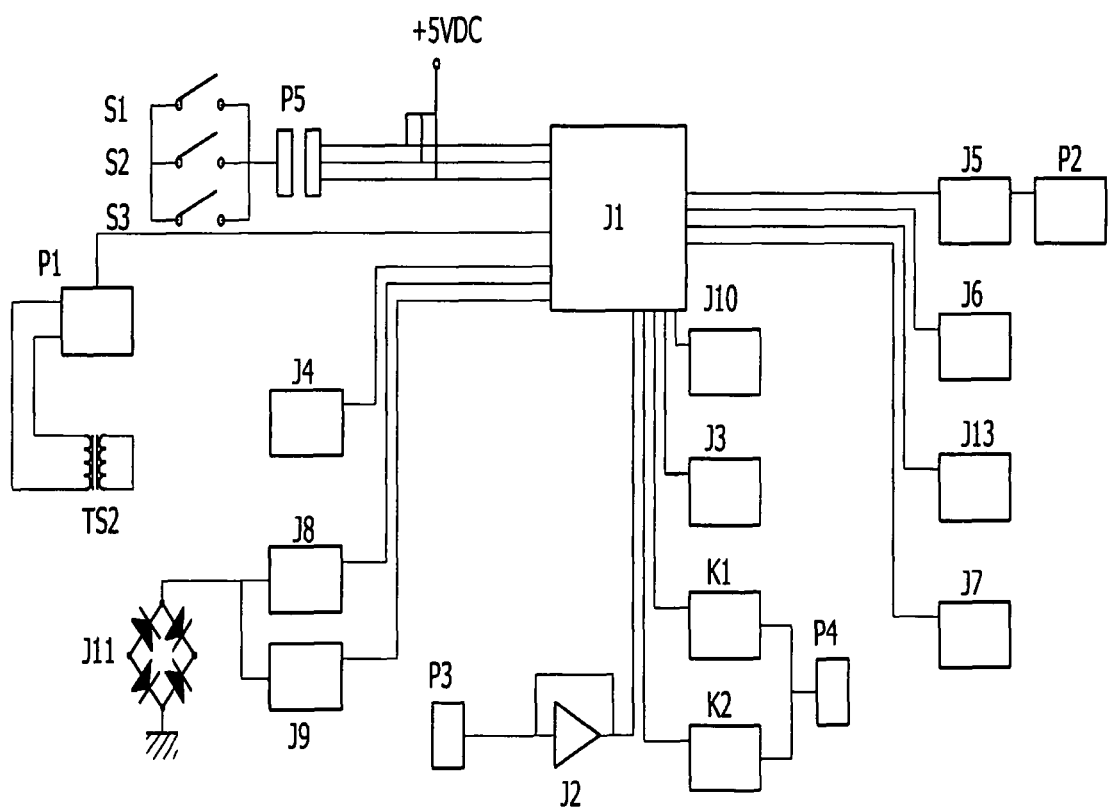
FIG. 15 is a circuit diagram illustrating a tracking device controller of the solar servo-control tracking device according to the embodiment of the present invention.

FIG. 12 is a schematic diagram illustrating a measurement of a solar azimuth performed by the integrated control panel, FIG. 13 shows circuit diagrams of the integrated control panel, FIG. 14 is a schematic diagram illustrating an operating angle servo-control of the solar module assembly of the solar servo-control tracking device according to the embodiment of the present invention, and FIG. 15 is a circuit diagram illustrating a tracking device controller.

As illustrated in FIG. 12, the solar cell sensor unit 300 measures luminance of sunrays at a solar azimuth to detect a maximal solar azimuth of the sunrays entering at a maximal incident angle. A solar cell rotation control signal 511 of 30 degrees to 150 degrees is periodically input to the solar cell sensor unit 300. A rotation angle calculator 521 compares a rotation angle signal 580 detected and amplified by a rotation angle sensor 570 with the solar cell rotation angle control signal 511. An error of the solar cell rotation angle is compensated by a proportional-integral-derivative (PID) servo controller 530 and is applied to a stepping motor driver 540. The stepping motor driver 540 drives the stepping motor 550 and in this case the rotation angle 560 is detected by the rotation angle sensor 570 to be fed back to the rotation angle calculator 521. A rotation angle of a solar cell 590 fixed to the stepping motor 550 is controlled by the stepping motor 550 and continuously scans luminance 600 every rotation angle of the solar cell 590 so that maximal luminance of the sunrays with respect to the rotation angle can be detected.

FIG. 13 shows circuit diagrams of the integrated control panel 500 detecting the maximal luminance as depicted in FIG. 12, and the integrated control panel 500 includes a manual/automatic mode switch SW1 selected by an operator, a real time counter (DS1307) U5 to which a period is set to measure the solar azimuth by time period in real time, a first buffer circuit U2 to which a rotation angle of the solar cell sensor unit 300 is input through the manual/automatic mode switch selected by the operator, a second buffer circuit U3 to which the luminance of sunrays, measured at the rotation angle by the solar cell sensor unit 300 by the selection of the manual/automatic mode switch, is input, a microcomputer U1 receiving the rotation angles of the first and second buffer circuits and the luminance of sunrays to output a rotation angle control signal through Darlington transistors U7 and U8 to the solar cell sensor unit 300 and outputting an operating angle control signal with respect to a maximal solar azimuth calculated by comparing the solar azimuth with respect to the luminance of sunrays with a solar azimuth that is measured in real time in accordance with the period of the real time counter, a wireless communication module U9 transmitting the operating angle control signal to the tracking device controllers 70, a memory U6 in which data of the phase current of the AC single phase and the operating angles of the solar module assemblies received from the tracking device controllers 70 through the wireless communication module U9 are stored, and a TCP/IP communication module U11 transmitting the phase current and operating angle data read and outputted from the memory U6 by the microcomputer U1.

The integrated control panel 500 further includes a second switch as a horizontal position angle correction mode switch SW2 correcting initial position angles of the solar module assemblies and a third switch as a time setting mode switch SW3 for real time setting in addition to the first switch as the manual/automatic mode selecting switch SW1. Selecting signals of the first, second, and third switches attached to the outer side of the case are inputted to the microcomputer U1 via a connector W2.

The horizontal position angle correction mode switch SW2 is used to initially set horizontal angles of the solar module assemblies after the rotation angle sensor 330 is installed to the solar cell sensor unit 300. In this case, the rotation angle sensor 330 has the same capacity as that of the operating angle sensor 59 of the operating angle sensor unit 50 to output absolutely same rotation angles with respect to displacement. That is, the rotation angle sensor 330 sets a solar cell rotation angle of the solar cell sensor unit 300 to be equal to an operating angle of the operating angle sensor unit 50. The time setting mode switch SW3 sets the time of the integrated control panel 500 in an initial state.

Signals of the first, second, and third switches, SW1, SW2 and SW3, are supplied to the microcomputer U1 through a pull-up resistor. AC electric power of 220V is inputted through the connector W1 and is converted into smoothed DC power by means of a transformer TS1 and bridge diodes U15. In order to supply electric power suitable for driving respective circuits, electric power of +15V DC and +5V DC is supplied to the stepping motor 320 and the microcomputer U1 through a +15 VDC regulator U13 and a +5 VDC regulator U14, respectively. The electric power is supplied to the wireless communication module U9 and the TCP/IP communication module U11 by a +3.6 VDC regulator U12.

In order to control the rotation angle of the stepping motor 320, the microcomputer U1 outputs the rotation angle control signal to the stepping motor 320 of the solar cell sensor unit 300 using the Darlington transistors U7 and U8 and connectors W6 and W7. Moreover, an analog input signal is inputted to an analog-digital converter of the microcomputer U1 to provide a function of measuring an environmental factor.

In other words, in order to detect the rotation angle of the solar cell as the analog input signal, the rotation angle sensor 330 is connected to the connector W3 such that the first buffer circuit U2 performs the signal processing of the rotation angle, the solar cell output signal as the analog input signal is supplied to the second buffer circuit U3 via a connector W4 such that the second buffer circuit U3 performs a signal processing of luminance, and in order to protect the solar module assemblies from typhoon, an output signal of an anemometer as an analog input signal is supplied to the third buffer circuit U4 via a connector W5 such that the third buffer circuit U4 performs signal processing of wind velocity. Moreover, an oscillator U16 applies a clock signal to the microcomputer U1.

The wireless communication module receives an optimal solar azimuth, transmits the operating angle control signal and a control signal for maintaining the solar module assemblies in a horizontal state when a natural calamity such as a typhoon or a fire is generated, and receives the operating angle of the solar module assemblies and an operation state of the AC single phase inductor.

The wireless communication module U9 is an RS232C module and is interfaced by the TCP/IP communication module U11 and an interface IC U10. The RS232C, that is, the wireless communication module U9, is connected to the operator's computer via a connector W8 such that the operator remotely monitors the operational state of the integrated control panel. The operator controls the integrated control panel 500 from a long distance using the TCP/IP communication module U11 interfaced with the RS23C module U9 and the interface IC U10.

The phase current of the AC single phase inductor and information on the operating angles of the solar module assemblies are stored in the memory U6 such that data stored in the memory U6 are read to be transmitted when the remote monitoring is performed.

FIG. 14 is a schematic diagram illustrating an operating angle servo-control of the solar module assemblies, in order to control the operating angles of the six or more solar module assemblies. As illustrated in the drawing, each of the tracking device controllers 70 performs the operating angle servo-control, and an automatic mode and a manual mode are provided by the manual/automatic mode selector 140.

The automatic mode is activated when the photovoltaic generation is performed, and in the automatic mode, the operation angle control signal 110 is received from the integrated control panel 500 to perform the operation angle servo-control of the solar module assemblies. The operating angle control signal 110 of the integrated control panel 500 and operating angle output signals 220 of the solar module assemblies detected and amplified by the operating angle sensor 210 are compared by the operating angle processor 120 such that error of the operating angle of the solar module assemblies is compensated by a proportional-integral-derivative control performed by a PID servo-controller 130 and is supplied to an AC single phase inductor driver 150 by the manual/automatic mode selector 140 to drive the AC single phase inductor 170 and an operating angle 200 for driving the solar module assemblies is outputted through a contact B of a relay 180. In this case, the phase current of the AC single phase inductor 170 is detected by a current sensor 160 to be compared with a reference phase current 230. When the phase current is greater than the reference phase current, the relay 180 is switched from the contact B to a contact A to interrupt the electric power supplied to the AC single phase inductor 170 driving the solar module assemblies.

The manual mode is used when maintenance of the solar tracking device is performed and is selected by the operator manipulating the manual/automatic mode selector 140 to open the operating angles of the solar module assemblies. The manual/automatic mode selector 140 is switched to the manual mode such that a driving command is supplied to the AC single phase inductor driver 150 to drive the AC single phase inductor 170 and to control the output of the operation angles of the solar module assemblies.

FIG. 15 is a circuit diagram illustrating the tracking device controllers that implement the operation angle servo-control. Each of the tracking device controllers includes: a manual/automatic mode switch S1 selected by an operator; a buffer circuit J2 to which the operating angle of the solar module assembly detected by the operating angle sensor unit is inputted when the automatic mode of the manual/automatic mode switch S1 is selected by the operator; wireless communication modules J5 and J6 which receive an operating angle control signal remotely transmitted by the integrated control panel; a microcomputer J1 having a memory storing the operating angle and the phase current of the AC single phase inductor and outputting a servo-control signal for the PID servo-control of the solar module assembly to the AC single phase inductor of the high torque driving unit 20, through a forward relay K1 and a reverse relay K2 in accordance with a value calculated from the operating angle inputted through the buffer circuit J2 and the operating angle control signal inputted through the wireless communication modules J5 and J6, to control the operating angle of the solar module assembly; and an RF communication module or a Bluetooth communication module J7 remotely transmitting data on the operating angle and the phase current of the AC single phase inductor stored in the memory.

In addition to the first switch, the manual/automatic mode switch S1, there is a second switch, the horizontal position angle correction mode switch S2 correcting an initial position angle of the solar module assembly, and a third switch, the time setting mode switch S3 for real time setting. Selection signals of the first, second, and third switches attached to the outer side of the case are inputted to the microcomputer J1 through a connector P5.

The horizontal position angle correction mode switch S2 is used to initially set a horizontal angle of the solar module assembly after the operating angle sensor 59 of the solar module assembly is installed to the high torque driving unit 20. The time setting mode switch S3 sets time of the tracking device controller 70 in an initial state.

Signals of the first, second, and third switches S1, S2, and S3 are supplied to the forward relay K1 and the reverse relay K2 via the connector P1, to be connected to the AC single phase inductor through the connector P4. In addition, a relay driving IC J4 is used to excite the relays.

AC electric power of 220V is converted into smoothed DC power by means of a transformer TS2 and bridge diodes J11. Electric power of +15V DC and +5V DC are supplied to the buffer circuit J2 and the microcomputer J1 through a +15 VDC regulator J8 and a +5 VDC regulator J9, respectively. The electric power is supplied to the wireless communication modules J5 and J6 and the RF communication module or the Bluetooth communication module J7 by a +3.6 VDC regulator J10.

The wireless communication modules J5 and J6 include an RS232C module J5 and an RS232C module J6 and are interfaced with the RF communication module or the Bluetooth communication module J7 and an interface IC J13. The RS232C modules J5 and J6, the wireless communication modules, are connected to an operator's computer via a connector P2 such that the operator remotely monitors the operational state of the tracking device controller. The operator controls the tracking device controller 70 from a distance using the RF communication module or the Bluetooth communication module J7 interfaced with the RS23C modules J5 and J6 and the interface IC J13.

When the AC single phase inductor 170 is continuously operated due to malfunction of the solar module assembly, a signal inputted through a current sensor connector P3 is used by the buffer circuit J2 to detect the phase current of the AC single phase inductor 170 and to compare an operating time with the reference phase current to determine whether the solar module assembly has malfunctioned.

On the other hand, in order to verify the precision and reliability of the operating angle control signal remotely received and inputted from the integrated control panel 500 through the wireless communication modules J5 and J6, the tracking device controller 70 includes a real time counter (DS1307) J3 by which a period for measuring the solar azimuth by time period in real time can be measured.

The microcomputer U1 of the integrated control panel 500 remotely outputs the operating angle control signal (with respect to the maximal solar azimuth) and the maximal solar azimuth to the tracking device controllers 70 through the wireless communication module U9. Each of the microcomputers J1 of the tracking device controllers 70 compares the maximal solar azimuth remotely received through the wireless communication modules J5 and J6 with the solar azimuth calculated by a real time azimuth equation using the real time counter (DS1307) J3 and outputs only the verified operating angle control signal to the AC single phase inductors 21 of the high torque driving units 20.

Figure 16:
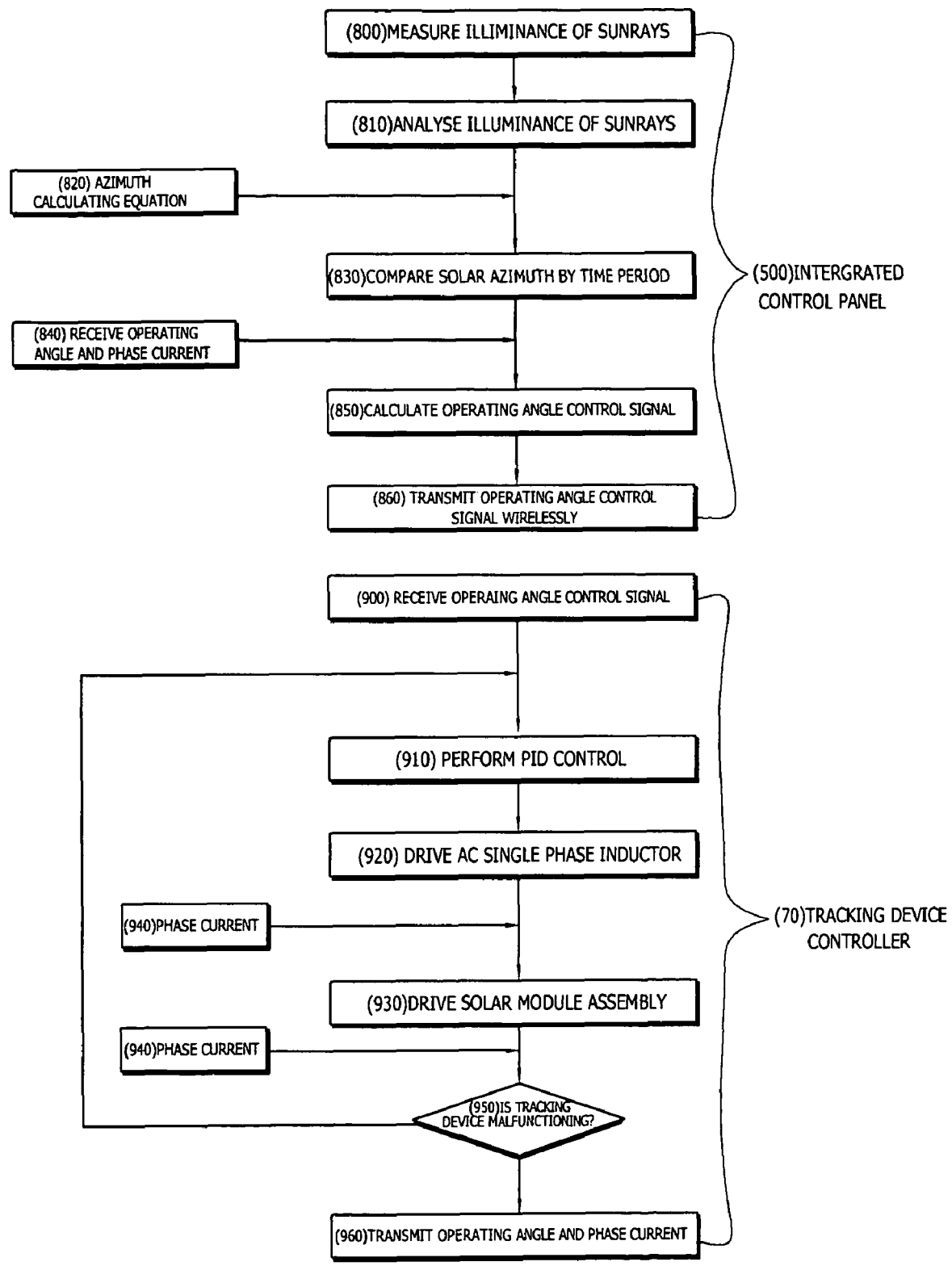
FIG. 16 is a flowchart illustrating the control performed by the integrated control panel and the tracking device controllers.
Figure 17:
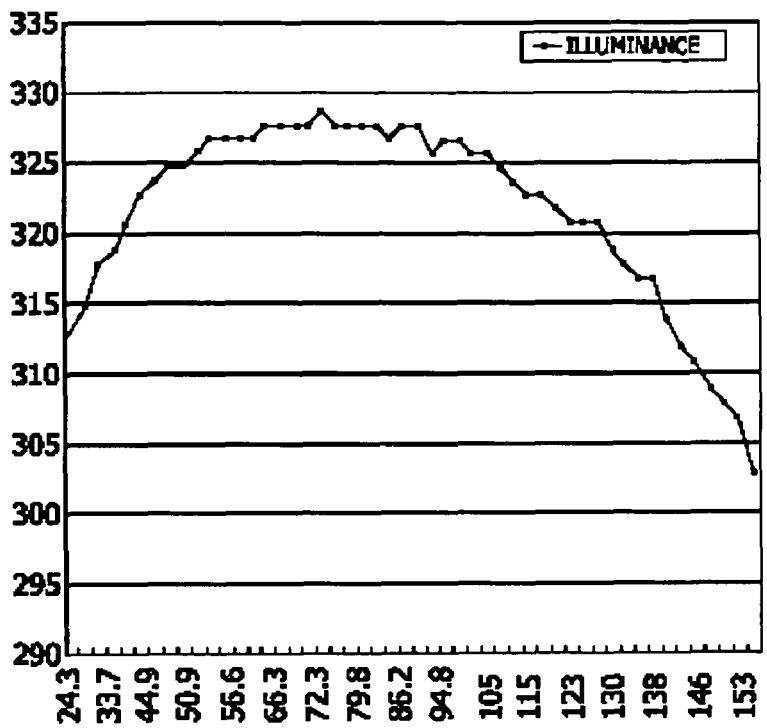
FIG. 17 is a view illustrating response characteristics of the solar cell sensor unit with respect to the solar azimuth (X-axis represents a solar azimuth and Y-axis represents luminance measured by the solar cell sensor unit).
Figure 18:
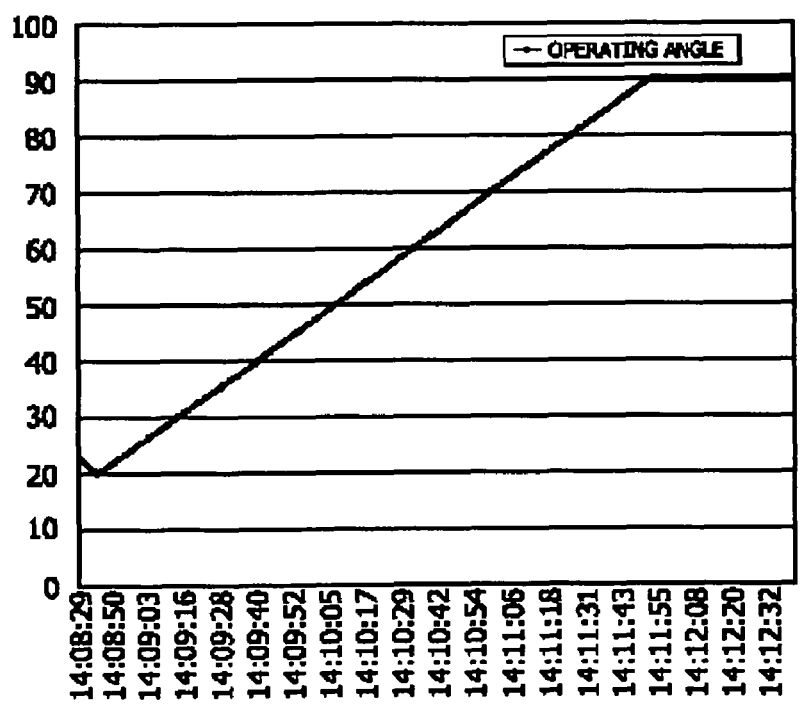
FIG. 18 is a view illustrating a time response operation characteristic of the solar module assembly (X-axis represents time and Y-axis represents a driving angle of the solar module assembly).

FIG. 16 is a flowchart illustrating the control performed by the integrated control panel and the tracking device controllers. FIG. 17 is a view illustrating response characteristics of the solar cell sensor unit with respect to the solar azimuth where X-axis represents a solar azimuth and Y-axis represents luminance measured by the solar cell sensor unit, and FIG. 18 is a view illustrating a time response operation characteristic of the solar module assembly where X-axis represents time and Y-axis represents a driving angle of the solar module assembly.

FIG. 16 shows a control program implementing remote control and remote monitoring smoothly performed between the integrated control panel 500 and the tracking device controllers 70. As illustrated in the drawing, the integrated control panel 500 measures the luminance of sunrays in a range of 30 degrees to 150 degrees through the solar cell sensor unit 300 (800), analyses the measured luminance of sunrays with respect to the operating angle detected by the operating angle sensor units 50 to set an operation angle range of the maximal luminance (810), and compares the solar azimuth calculated by the azimuth equation (820) with the operating angle range of the maximal luminance (830) to calculate the operating angle control signal for the solar module assemblies (850) and to transmit the operating angle control signal to the tracking device controllers 70 through the wireless communication module via a wireless link (860).

On the other hand, the integrated control panel 500 receives the operating angles of the solar module assemblies and the measured phase currents of the AC single phase inductors from the tracking device controllers 70 via a wireless link (840) to transmit the operating angle control signals to the solar module assemblies to track sun rays in accordance with the operating angle control signals, or to transmit control signals to the tracking device controllers 70 to stop the solar module assemblies when the AC single phase inductors are in an over-current state.

Each of the tracking device controllers 70 receives the operating angle control signal from the integrated control panel 500 (900) to calculate an error of the operating angle measured by the operating angle sensor unit 50, performs the compensation by the PID servo-control using the calculation (910) to drive the AC single phase inductor (920) so as to drive the solar module assembly (930), and in this case measures the phase current of the AC single phase inductor (940) and the operating angle of the solar module assembly to implement the servo-position angle control. When the solar module assembly malfunctions in being unable to track in accordance with the operating angle control signal (950), the tracking device controller 70 transmits the operating angle of the solar module assembly and the phase current signal of the AC single phase inductor to the integrated control panel via a wireless link (960). The operator can check by remote monitoring through the TCP/IP communication module whether the solar tracking device malfunctions and can take emergency measures.

FIG. 17 is a view illustrating a characteristic curve of luminance continuously determined in relation to the solar azimuth in a range of 24.3 degrees to 153 degrees by the solar cell sensor unit 300. For example, when a solar azimuth of 72.3 degrees at the maximal luminance is detected, the integrated control panel 500 transmits the operating angle control signal to the multiple tracking device controllers 70 of the solar tracking devices. The solar cell sensor unit 300 can detect the optimal solar azimuth as in the characteristic curve.

FIG. 18 is a view illustrating a time response operation characteristic of the solar module assemblies when the operating angle control signal of 30 degrees to 90 degrees is applied at the initial position. Therefore, it can be confirmed that a precise operating angle servo-control is implemented using the operating angle sensor unit 50. As known from this result, each of the tracking device controllers 70 receives the optimal operating angle control signal from the integrated control panel 500 to precisely perform the operating angle servo-control so that efficiency of photovoltaic power generation can be improved by 5% to 10%.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for solar servo control tracking having an integrated control device, comprising:

a single solar cell sensor unit (300) for detecting luminance of sunrays with respect to a solar azimuth consisting; a stepping motor (320) for providing rotation power to measure an incident angle of sun rays entering at a maximal luminance, so that a solar cell scans luminance of 30 to 150°; a solar cell rotation shaft (360) for transmitting the rotation power of the stepping motor; a rotation angle sensor (330) for measuring an azimuth with respect to the luminance of the sunrays; a solar cell (310) installed to the solar cell rotation shaft (360) for measuring the luminance of the sunrays; a base plate (400) for mounting a pair of supports (380, 390), stepping motor, solar cell rotation shaft, and rotation angle sensor; a case (340) installed on the base plate (400) for enveloping to protect the stepping motor, the solar cell, the solar cell rotation shaft, and the rotation angle sensor; a lucid semi-spherical cover (410) installed on the top of the case (340) for protecting the components in the case (340) against moisture; and a waterproof connector (420) installed to lateral side of the case (340) for connecting an electric power and providing input signal from the integrated control panel to the stepping motor and output signal from the rotation angle sensor, an integrated control panel (500) for remotely transmitting a control signal based on a maximal solar azimuth calculated by comparing a solar azimuth based on the luminance of sun's ray detected by the solar cell sensor unit (300) with a solar azimuth measured in real time;

a plurality of solar tracking devices (1 to N) having a solar tracking device controller (70) for remotely receiving the control signal via a wireless communication; wherein the integrated control panel (500) and individual tracking device controller (70) have a wireless communication module, which is either one of a TCP/IP communication module, a RF communication module or a Bluetooth communication module for remotely operating the solar module assemblies (10) and the solar cell sensor unit (300) with respect to the solar azimuth, even if it is cloudy or bad weather;

a high torque driving unit (20) having an AC single phase inductor (21) to generate a driving torque by servo-control of the tracking device controller (70) in accordance with the control signal;

a plurality of solar module assemblies (10) driven by the high torque driving unit (20) to track the solar azimuth in accordance with the control signal; and an operating angle sensor unit (50) installed to the high torque driving unit (20) to detect various operating angles of the solar module assemblies (10) that track the sun in accordance with the control signal.

2. The apparatus for solar servo control tracking as claimed in claim 1, wherein the integrated control panel (500) further comprising:

a manual/automatic mode switch (SWI) for selecting an operation mode by an operator;

a real time counter (U5) for periodically measuring the solar azimuth in real time;

a first buffer circuit (U2) for inputting a rotation angle of the solar cell sensor unit (300);

a second buffer circuit (U3) for measuring and inputting the luminance of sunrays at the rotation angle of the solar cell sensor unit (300);

a microcomputer (U1) for receiving the rotation angles of the first and second buffer circuits and the luminance of sunrays to output a rotation angle control signal through Darlington transistors (U7, U8) to the solar cell sensor unit (300), and outputting an operating angle control signal with respect to a maximal solar azimuth calculated by comparing the solar azimuth with respect to the luminance of sunrays with a solar azimuth measured in real time by the real time counter (US);

a wireless communication module (U9) for transmitting the operating angle control signal to the tracking device controller (70);

a memory (U6) for storing a phase current data of AC single phase and operating angles of the solar module assembly (10) received from the tracking device controller (70) via the wireless communication module;

a TCP/IP communication module (U11) for transmitting the phase current and operating angle data, which is read and outputted from the memory (U6) by the microcomputer (U1);

a horizontal position angle correction mode switch (SW2) initially sets horizontal angles of the solar module assembly (10); and a time setting mode switch (SW3) sets an initial time of the integrated control panel (500) in real time.

3. The apparatus for solar servo control tracking as claimed in claim 1, wherein said high torque driving unit (20) having the AC single phase inductor (21) is installed on the middle of the solar module assembly (10), further comprising:

a cooling fan (23) attached to the AC single phase inductor (21) for cooling the AC single phase inductor (21);

a primary reducer (22), a secondary reducer (35), and a third worm reducer (25, 30), connected sequentially to the AC single phase inductor (21) to generate a high torque, and an adjusting shaft (7) of the solar module assembly (10) is installed to a worm wheel (30) of the third worm reducer (25, 30).

4. The apparatus for solar servo control tracking as claimed in claim 1, wherein the integrated control panel (500) measures the luminance of sunrays in a range of 30° to 150° via the solar cell sensor unit (300), analyses the measured luminance of sunrays with respect to the operating angle detected by the operating angle sensor unit (50) to set an operation angle range of the maximal luminance, and compares the solar azimuth measured in real time with the operating angle range at the maximal luminance to calculate an operating angle control signal of the solar module assembly (10) to transmit the operating angle control signal to the tracking device controller (70) via a wireless link;

individual tracking device controller (70) receiving the operating angle control signal from the integrated control panel (500) to calculate an error of the operating angle measured by the operating angle sensor unit (50), performing the compensation by the proportional-integral-derivative (PID) servo-control using the calculation to drive the AC single phase inductor (21) so as to drive the solar module assembly (10), and transmitting the operating angle of the solar module assembly (10) and the phase current signal of the AC single phase inductor (21) to the integrated control panel (500) via a wireless link when the solar module assembly (10) occurs malfunctions so, it is unable to track according to the operating angle control signal.

5. The apparatus for solar servo control tracking as claimed in claim 1, wherein the integrated control panel (500) receives the operating angles of the solar module assembly (10) and the measured phase currents of the AC single phase inductors (21) from the tracking device controller (70) via a wireless link to transmit the operating angle control signals to the tracking device controller (70) to be operated by the operating angle control signals, or to transmit control signals to the tracking device controller (70) to stop the solar module assembly when the AC single phase inductors (21) are in an over-current state.

6. The apparatus for solar servo control tracking as claimed in claim 1, wherein individual the tracking device controller (70) comprising:

a manual/automatic mode switch (S1) selected by an operator;

a buffer circuit (J2) for detecting and inputting the operating angle of the solar module assembly (10);

wireless communication modules (J5, J6) for receiving an operating angle control signal remotely transmitted by the integrated control panel;

a microcomputer (J1) having a memory for storing the operating angle and the phase current of the AC single phase inductor (21) and outputting a servo-control signal for a proportional-integral-derivative (PID) servo-control of the solar module assembly (10) to the AC single phase inductor (21) of the high torque driving unit (20) through a forward relay (K1) and a reverse relay (K2) in accordance with a value calculated from the operating angle inputted through the buffer circuit (J2) and the operating angle control signal inputted through the wireless communication modules (J5, J6) to control the operating angle of the solar module assembly (10); and either one of a RF communication module or a Bluetooth communication module (J7) is for remotely transmitting data of the operating angle and the phase current of the AC single phase inductor (21) for storing in the memory;

a horizontal position angle correction mode switch (S2) initially sets horizontal angles of the solar module assembly (10); and a time setting mode switch (S3) sets an initial time of the integrated control panel (500) in real time.

7. The apparatus for solar servo control tracking as claimed in claim 1, wherein the microcomputer (U1) of the integrated control panel (500) further outputs a maximal solar azimuth;

the wireless communication module (U9) of the integrated control panel (500) remotely transmitting the outputted maximal solar azimuth to the tracking device controller (70);

individual tracking device controller (70) consisted of a-real time counter (J3) for setting and measuring the solar azimuth periodically in real time;

wireless communication modules (J5, J6) of the tracking device controller (70) remotely receive the maximal solar azimuth;

individual microcomputer (JI) of the tracking device controller (70) comparing the maximal solar azimuth remotely received through the wireless communication modules (J5, J6) with the solar azimuth calculated by a real time azimuth equation using the real time counter (J3), and outputs only the verified operating angle control signal to the AC single phase inductor (21) of the high torque driving unit (20).

\* \* \* \* \*